(12) United States Patent
Mosher et al.

(10) Patent No.: US 11,455,898 B2
(45) Date of Patent: Sep. 27, 2022

(54) AUTOMATED DETECTION AND AVOIDANCE SYSTEM (71) Applicant: The Boeing Company, Chicago, IL (US)

(72) Inventors: Aaron Y. Mosher, Madison, AL (US); Charles B. Spinelli, Anthem, AZ (US); Morgan E. Cook, Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 189 days.

(21) Appl. No.: 16/721,690

(22) Filed: Dec. 19, 2019

(65) Prior Publication Data
US 2020/0135038 A1 Apr. 30, 2020

Related U.S. Application Data (63) Continuation of application No. 15/675,591, filed on Aug. 11, 2017, now Pat. No. 10,515,559.

(51) Int. Cl.
G08G 5/04 (2006.01)
B64C 39/02 (2006.01)
(Continued)

(52) U.S. Cl.
CPC .......... *G08G 5/045* (2013.01); *B64C 39/024* (2013.01); *G06K 9/6269* (2013.01);
(Continued)

(58) Field of Classification Search
CPC .... G08G 5/045; G08G 5/0013; G08G 5/0021; G08G 5/0069; G06K 9/2018;
(Continued)

(56) References Cited

U.S. PATENT DOCUMENTS 6,163,309 A  12/2000 Weinert
8,587,770 B1  11/2013 Johnston et al.
(Continued)

FOREIGN PATENT DOCUMENTS

DE  102013206915 A1  10/2014
EP  1202214 A2  5/2002
(Continued)

OTHER PUBLICATIONS

European Application Serial No. 18179931.3, Office Action dated Sep. 24, 2020, 5 pgs.
(Continued)

*Primary Examiner* — Brian P Sweeney
(74) *Attorney, Agent, or Firm* — Kwan & Olynick LLP (57) ABSTRACT In general, certain embodiments of the present disclosure provide a detection and avoidance system for a vehicle. According to various embodiments, the detection and avoidance system comprises an imaging unit configured to obtain a first image of a field of view at a first camera channel. The first camera channel filters radiation at a wavelength, where one or more objects in the field of view do not emit radiation at the wavelength. The detection and avoidance system further comprises a processing unit configured to receive the first image from the imaging unit and to detect one or more objects therein, as well as a notifying unit configured to communicate collision hazard information determined based upon the detected one or more objects to a pilot control system of the vehicle. Accordingly, the pilot control maneuvers the vehicle to avoid the detected objects.

20 Claims, 7 Drawing Sheets (51) Int. Cl.
*G08G 5/00* (2006.01)
*G06K 9/62* (2022.01)
*G06K 9/20* (2006.01)
*G06K 9/00* (2022.01)
*G06V 10/143* (2022.01)
*G06V 10/147* (2022.01)
*G06V 20/13* (2022.01)
*G06V 20/58* (2022.01)
*G06V 10/26* (2022.01)
*G06V 10/46* (2022.01)

(52) U.S. Cl.
CPC ......... *G06K 9/6289* (2013.01); *G06V 10/143* (2022.01); *G06V 10/147* (2022.01); *G06V 20/13* (2022.01); *G06V 20/58* (2022.01); *G08G 5/0013* (2013.01); *G08G 5/0021* (2013.01); *G08G 5/0069* (2013.01); *B64C 2201/123* (2013.01); *B64C 2201/127* (2013.01); *B64C 2201/141* (2013.01); *G06V 10/26* (2022.01); *G06V 10/467* (2022.01)

(58) Field of Classification Search
CPC ............... G06K 9/6289; G06K 9/0063; G06K 9/00805; G06K 9/209; G06K 9/6269; G06K 9/34; G06K 2009/4666; B64C 39/024; B64C 2201/141; B64C 2201/127; B64C 2201/123; G01S 11/12; G06V 10/143; G06V 10/147; G06V 20/13; G06V 20/58; G06V 10/26; G06V 10/467; G06V 20/17

See application file for complete search history.

(56) References Cited

U.S. PATENT DOCUMENTS

| | | | |
|---|---|---|---|
| 10,515,559 | B2 | 12/2019 | Mosher et al. |
| 2007/0041614 | A1 | 2/2007 | Tanji |
| 2014/0161345 | A1 | 6/2014 | Djugash |
| 2015/0254985 | A1* | 9/2015 | Fisher ................ G06K 9/00362 348/148 |
| 2015/0302591 | A1 | 10/2015 | Kim et al. |
| 2016/0282131 | A1 | 9/2016 | Palfreyman |
| 2017/0076438 | A1 | 3/2017 | Kottenstette et al. |
| 2018/0091797 | A1 | 3/2018 | Armatorio et al. |
| 2018/0096610 | A1 | 4/2018 | Ray et al. |
| 2019/0019423 | A1* | 1/2019 | Choi ................... G05D 1/0088 |
| 2019/0051191 | A1 | 2/2019 | Mosher et al. |

FOREIGN PATENT DOCUMENTS

| | | |
|---|---|---|
| EP | 1202241 A1 | 5/2002 |
| EP | 1202214 A3 | 2/2005 |
| JP | 2007052645 A | 3/2007 |
| JP | 2014116007 A | 6/2014 |
| JP | 2015533109 A | 11/2015 |
| WO | 2006036398 A2 | 4/2006 |
| WO | 2014028064 A3 | 4/2014 |
| WO | 2016092537 A1 | 6/2016 |

OTHER PUBLICATIONS

U.S. Appl. No. 15/675,591, Examiner Interview Summary dated Jul. 5, 2019, 3 pgs.
U.S. Appl. No. 15/675,591, Non Final Office Action dated Apr. 3, 2019, 10 pgs.
U.S. Appl. No. 15/675,591, Notice of Allowance dated Aug. 21, 2019, 8 pgs.
Coombes, Matthew, et al., Unmanned Ground Operations Using Semantic Image Segmentation through a Bayesian Network, 10 pgs.
European Application Serial No. 18179931.3, Search Report dated Jan. 17, 2019, 12 pgs.
European Application Serial No. 18179931.3, Search Report dated Jun. 14, 2019, 14 pgs.
Rasmussen, Christopher, Superpixel Analysis for Object Detection and Tracking with Application to UAV Imagery, 10 pgs.
Halgaonkar, S. Prasad. "Connected Component Analysis and Change Detection for Images." 2011, ijcttjournal.org/Volume1/issue-2/ijcttjournal-v1i2p24.pdf, 6 pages.
Admin. "Object Counting using Connected Component Labelling." Jun. 18, 2017, www.inforbes.com/2017/06/object-counting-using-connected.html, 2 pages.
Japanese Office Action, Application No. JP2018-147094, Notice of Reasons for Rejction, prepared Jun. 23, 2022, dated Jul. 5, 2022. 14 pages (combined English and Japanese).
Ministry of the Environment "1 3 Radiation " Chapter 1: Basic Knowledge Regarding Radiation. Mar. 31, 2013, www.env.go.jp/chemi/rhm/h29kisoshiryo/h29kiso-01-03-02.html, 1 page.

* cited by examiner

AUTOMATED DETECTION AND AVOIDANCE SYSTEM

CROSS-REFERENCE TO RELATED APPLICATIONS

This application is a continuation of U.S. patent application Ser. No. 15/675,591, entitled: "Automated Detection and Avoidance System," filed on Aug. 11, 2017, which is incorporated herein by reference in its entirety for all purposes.

TECHNICAL FIELD

The present disclosure relates generally to collision detection and avoidance systems, and more specifically, to systems and methods of automatic collision detection and avoidance by use of a threshold image.

BACKGROUND

Unmanned aerial vehicles (UAVs), remotely piloted or self-piloted aircrafts, have oftentimes been tasked to perform a variety of functions beyond the traditional surveillance and target tracking. The UAVs, although small and light-weight, can carry cameras, sensors, communications equipment, or other payloads. However, in order operate safely in shared airspace, a UAV needs to pilot itself at a safe distance from all kinds of airborne collision hazards, e.g., manned aircraft, other UAVs, birds, and low altitude obstacles.

Conventional automated detection and avoid systems such as Traffic Collision Avoidance System (TCAS) and Automatic Dependent Surveillance-Broadcast (ADS-B) can be impractical for vehicles or UAVs of relatively smaller sizes. In particular, the use of these conventional equipment on-board UAV may incur significant weight and power consumption on the very limited equipment carrying capability of UAVs. Further, the cost of equipment such as TCAS and transponders is high. Also, standard TCAS equipment is unable to interact with non-cooperating flying or still (non-moving) objects that are not equipped with the counterpart equipment. Hence, standard TCAS equipment is not able to guide UAVs out of collision under such circumstances.

Thus, there is a need of an on-board collision detection and avoidance system that is compact, light-weight and yet economical for UAVs to automatically detect and avoid air traffic collisions.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide systems, methods and vehicles for collision detection and avoidance. According to various embodiments, a detection and avoidance system for a vehicle is provided comprising an imaging unit configured to obtain a first image of a field of view at a first camera channel. The first camera channel filters radiation at a wavelength, where one or more objects in the field of view do not emit radiation at the wavelength. The detection and avoidance system further comprises a processing unit configured to receive the first image from the imaging unit and to detect one or more objects therein, as well as a notifying unit configured to communicate collision hazard information determined based upon the detected one or more objects to a pilot control system of the vehicle.

In some embodiments, the wavelength at which the first camera channel of the detection and avoidance system filters radiation is within the ultraviolet (UV) range, and the first camera channel filters radiation by use of a filter having a bandpass wavelength range in the ultraviolet range.

In some embodiments, the processing of the first image of the detection and avoidance system comprises horizon detection. In some embodiments, the horizon detection comprises growing a horizon region by adding neighboring pixels to include ground objects extending from an edge of the horizon region.

In some embodiments, the one or more objects are detected by use of connected component labeling (CCL). In some embodiments, the processing of the first image further comprises selecting by a criterion, from the detected one or more objects to exclude objects not likely collision hazards.

In some embodiments, the detection and avoidance system further comprises an analyzing unit configured for determining collision hazard information based on the detected one or more objects. In some embodiments, the analyzing unit comprises a learning mechanism to classify the one or more objects upon recognition.

In some embodiments, the imaging unit is further configured to obtain a second image of a substantially same field of view at a second camera channel, the second camera channel not filtering radiation at the wavelength. The processing unit is also further configured to identify, in the first image, one or more first regions corresponding to the one or more objects, and to identify, in the second image, one or more second regions corresponding to the one or more first regions. The detection and avoidance system further comprises an analyzing unit configured to determine collision hazard information based on the one or more first and second regions. In some embodiments, the second image is a color image.

In some embodiments, the analyzing unit comprises a learning mechanism to classify objects upon recognition. In some embodiments, the analyzing unit produces region segmentations for the one or more objects upon recognition in addition to classifying. In some embodiments, the detection and avoidance system is for an unmanned vehicle. In some embodiments, the detection and avoidance system is for an unmanned aerial vehicle.

In yet another embodiment of the present disclosure, a method of detection and avoidance by a vehicle is provided comprising obtaining a first image of a field of view at a first camera channel. The first camera channel filters radiation at a wavelength, where one or more objects in the field of view do not emit radiation at the wavelength. The method further comprises processing the first image to detect the one or more objects, and communicating collision hazard information determined based upon the detected one or more objects to a pilot control system of the vehicle.

In some embodiments, the wavelength at which the first camera channel filters radiation is within the ultraviolet range, and the first camera channel filters radiation by use of a filter having a bandpass wavelength range in the ultraviolet range.

In some embodiments, the processing of the first image comprises horizon detection. In some embodiments, the horizon detection comprises growing a horizon region by adding neighboring pixels to include ground objects extending from an edge of the horizon region. In some embodiments, the one or more objects are detected by use of connected component labeling (CCL). In some embodiments, the processing of the first image further comprises selecting, by a criterion, from the detected one or more objects to exclude objects that are not likely collision hazards.

In some embodiments, the method further comprises communicating the detected one or more objects to an analyzing unit to determine collision hazard information. In some embodiments, the analyzing unit comprises a learning mechanism to classify the one or more objects upon recognition.

In some embodiments, the method further comprises obtaining a second image of a substantially same field of view at a second camera channel, the second camera channel not filtering radiation at the wavelength. The method also comprises identifying, in the first image, one or more first regions corresponding to the one or more objects, and identifying, in the second image, one or more second regions corresponding to the one or more first regions. The method further comprises communicating the one or more first and second regions to an analyzing unit to determine collision hazard information. In some embodiments, the second image is a color image.

In some embodiments, the analyzing unit comprises a learning mechanism to classify objects upon recognition. In some embodiments, the analyzing unit produces region segmentations for the one or more objects upon recognition in addition to classifying.

In some embodiments, the method further comprises performing maneuver to avoid the detected one or more objects. In some embodiments, the method maneuvers a vehicle. In some embodiments, the vehicle is an unmanned land vehicle; in some other embodiments, the vehicle is an unmanned aerial vehicle.

In still yet another embodiment of the present disclosure, an aviation vehicle is provided comprising a pilot control system and a detection and avoidance (DAA) system. The detection and avoidance system comprises an imaging unit configured to obtain a first image of a field of view at a first camera channel. The first camera channel filters radiation at a wavelength, where one or more objects in the field of view do not emit radiation at the wavelength. The detection and avoidance system further comprises a processing unit configured to receive the first image from the imaging unit and to detect one or more objects therein, as well as a notifying unit configured to communicate collision hazard information determined based upon the detected one or more objects to a pilot control system.

In some embodiments, wavelength at which the first camera channel filters radiation is within the ultraviolet range, and the first camera channel filters radiation by use of a filter having a bandpass wavelength range in the ultraviolet range.

In some embodiments, the processing of the first image comprises horizon detection. In some embodiments, the processing of the first image further comprises selecting, by a criterion, from the detected one or more objects to exclude objects not likely collision hazards.

In some embodiments, the detection and avoidance system further comprises an analyzing unit configured for determining collision hazard information based on the detected one or more objects.

In some embodiments, the imaging unit of the detection and avoidance system of the aviation vehicle is further configured to obtain a second image of a substantially same field of view at a second camera channel, the second camera channel not filtering radiation at the wavelength. The processing unit of the detection and avoidance system of the aviation vehicle is also further configured to identify, in the first image, one or more first regions corresponding to the one or more objects, and to identify, in the second image, one or more second regions corresponding to the one or more first regions. The detection and avoidance system of the aviation vehicle further comprises an analyzing unit configured to determine collision hazard information based on the one or more first and second regions. In some embodiments, the second image is a color image.

In some embodiments, the analyzing unit of the detection and avoidance system of the aviation vehicle comprises a learning mechanism to classify objects upon recognition. In some embodiments, the analyzing unit of the detection and avoidance system of the aviation vehicle produces region segmentations for the one or more objects upon recognition in addition to classifying.

In some embodiments, the pilot control system of the aviation vehicle maneuvers the vehicle to avoid the detected one or more objects. In some embodiments, the aviation vehicle is unmanned.

In still yet another embodiment of the present disclosure, a non-transitory computer readable medium is provided comprising one or more programs configured for execution by a computer system for detection and avoidance for a vehicle. The one or more programs comprise instructions for obtaining a first image of a field of view at a first camera channel. The first camera channel filters radiation at a wavelength, where one or more objects in the field of view do not emit radiation at the wavelength. The instructions further comprise processing the first image to detect the one or more objects, and communicating collision hazard information determined based upon the detected one or more objects to a pilot control system of a vehicle.

In some embodiments, the wavelength at which the first camera channel filters radiation is within the ultraviolet range, and the first camera channel filters radiation by use of a filter having a bandpass wavelength range in the ultraviolet range.

In some embodiments, the instructions further comprise communicating the detected one or more objects to an analyzing unit to determine collision hazard information. In some embodiments, the analyzing unit comprises a learning mechanism to classify the one or more objects upon recognition.

In some embodiments, the instructions further comprise obtaining a second image of a substantially same field of view at a second camera channel, the second camera channel not filtering radiation at the wavelength. The instructions also comprise identifying, in the first image, one or more first regions corresponding to the one or more objects, and identifying, in the second image, one or more second regions corresponding to the one or more first regions. The instructions further comprise communicating the one or more first and second regions to an analyzing unit to determine collision hazard information. In some embodiments, the second image is a color image.

In some embodiments, the analyzing unit comprises a learning mechanism to classify objects upon recognition. In some embodiments, the analyzing unit produces region segmentations for the one or more objects upon recognition in addition to classifying. In some embodiments, the pilot control system maneuvers the vehicle to avoid the detected one or more objects.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Reference will now be made in detail to some specific examples of the present disclosure including the best modes contemplated by the inventor for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

The present disclosure provides a detection and avoidance system for a vehicle such as an unmanned aerial vehicle (UAV) to detect collision hazardous objects using a threshold (first) image to mask out threshold objects posing collision hazards. Upon detection of the threshold objects, the detection and avoidance system notifies a pilot control system such as an autopilot control system of the vehicle to perform avoidance maneuvers in accordance with the collision hazard information determined based on the detected objects.

In some embodiments, the detection and avoidance system further comprises an analyzing unit which employs machine learning capabilities to recognize the threshold objects detected thereby. As such, classification information with respect to the detected objects is further identified and therefore utilized in determining the collision hazard information communicated to the pilot control system of the vehicle. In some embodiments, the detection and avoidance system further includes a machine learning system trained for detecting objects in the first image.

EXAMPLE EMBODIMENTS

Figure 1:
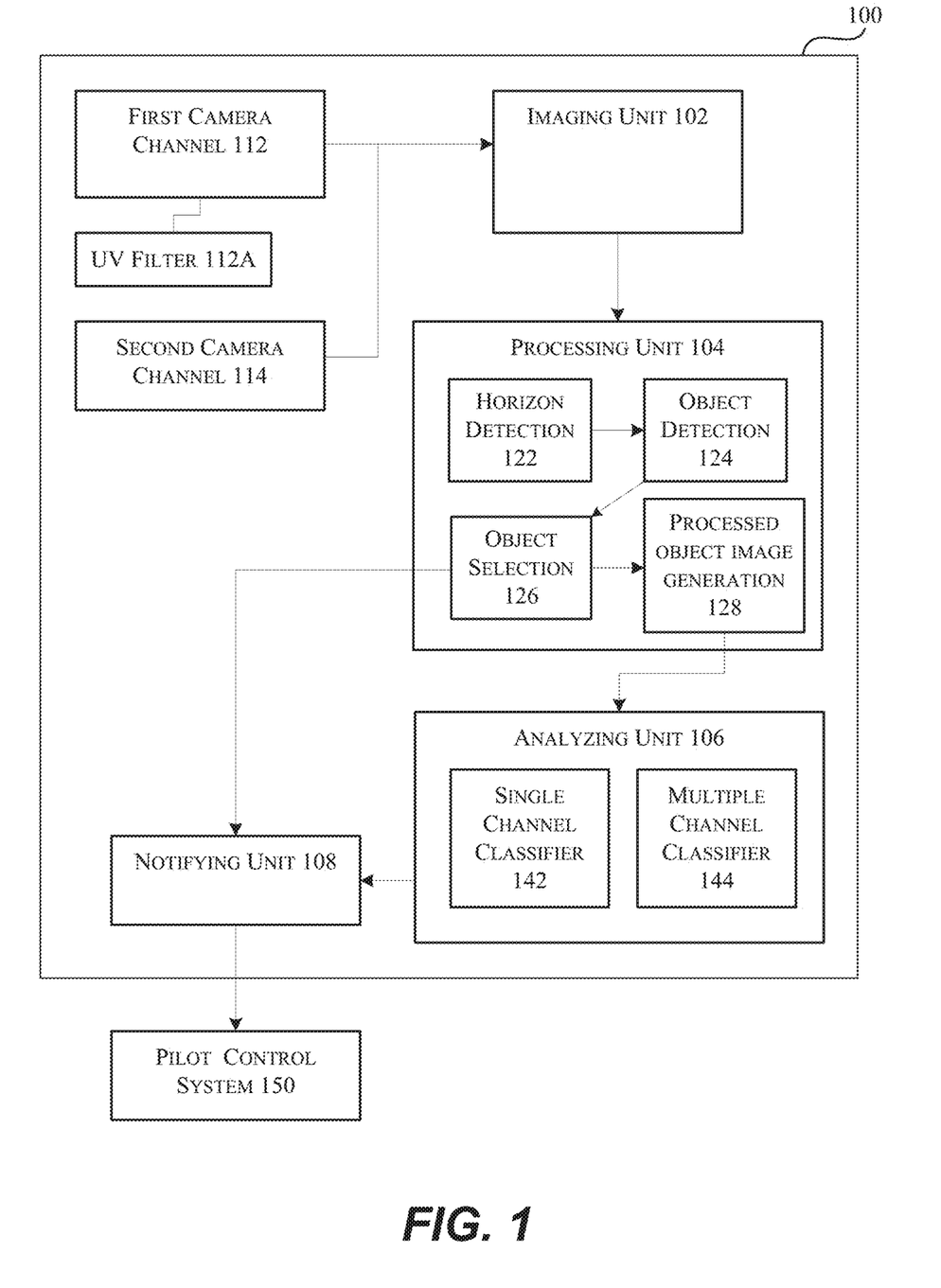
FIG. 1 illustrates a schematic block diagram of an example detection and avoidance system for a vehicle, in accordance with one or more embodiments of the present disclosure.

FIG. 1 illustrates a schematic block diagram of an example detection and avoidance system for a vehicle in accordance with one or more embodiments of the present disclosure. The detection and avoidance system 100 communicates collision hazard information to a pilot control system 150, such as an auto pilot control system, of the vehicle so that the vehicle is maneuvered accordingly to avoid collisions with the detected objects posing collision hazards. As shown herein, the system 100 includes a first camera channel 112, at which only radiation or light at a certain wavelength is allowed to pass through for an imaging unit 102 to capture a first image of a field of view. In other words, the first image records the field of view by use of light or radiation at the certain designated wavelength only, with radiation or light at wavelengths other than the certain wavelength being filtered out. In some embodiments, the first image is generated as a binary image, where a given pixel is either "ON" or "OFF". For example, pixels may be labeled "ON" if they are black or dark; and "OFF" if they are white or bright. In some embodiments, the first image is thresholding into a binary image, where pixels of values greater than a pre-determined threshold value are labeled "ON;" and "OFF" if less than the pre-determined threshold value.

As some objects in the field of view do not emit or re-emit radiation at that wavelength, the first image captured at the first camera channel 112 represents those objects as dark pixels or ON pixels. On the contrary, areas or regions illuminated by radiation or light at the certain designated wavelength, as well as objects emitting or re-emitting radiation at the certain designated wavelength, are represented in the first image as white pixels or OFF pixels. For example, the sun being an UV radiation source, sunlight-illuminated sky is captured in a UV photograph as a white background or in OFF pixels. At the same time, an airborne aircraft in the afore-mentioned sky is otherwise captured in dark or ON pixels as the aircraft blocks the radiation in the UV range from the sun, and the aircraft does not emit or re-emit UV radiation. Various UV filters which allow light in the UV range to pass while absorbing or blocking visible and infrared light can be used for UV photography at the first camera channel. Such UV filters can be made from special colored glass and/or may be coated with additional filter glass to further block unwanted wavelengths.

In some embodiments, the certain wavelength designated at the first camera channel 112 is within the ultraviolet (UV) range. In some embodiments, at the first camera channel 112, radiation within the UV range is captured by use of an UV filter 112A having a bandpass wavelength range in the ultraviolet (UV) range. In some embodiments, such an exemplary UV filter may be a Baader-U filter model #2458291 available from Baader Planetarium GmbH in Mammendorf, Germany, or a StraightEdgeU ultraviolet bandpass filter. model 379BP52 available from UVR Defense Tech, Ltd. in Wilton, N.H., USA.

In some embodiments, the detection and avoidance system 100 further includes a second camera channel 114, at which the imaging unit 102 captures a second image of a field of view that is substantially the same as the field of view at which the first image is obtained at the first camera channel 112. Given the information of the wavelength at which the first camera channel 112 filters radiation, the second camera channel 114 is configured not to filter radiation at the same wavelength. Accordingly, the objects not emitting or not re-emitting radiation, or areas not illuminated by radiation at the wavelength are nevertheless captured in the second image, not as dark or ON pixels only. For example, the second camera channel can be a RGB camera channel at which the second image is captured as a color image. As to the above-described airborne aircraft example, the aircraft can be represented in colors in the second image. In some embodiments, the second camera channel filters radiation at a wavelength other than the wavelength designated for the first camera channel for filtering.

Upon obtaining the first image, the imaging unit 102 communicates the first image to a processing unit 104. In some embodiments, the first image is a UV image where a UV filter is utilized at the first camera channel 112 to filter wavelength in the UV range. In some embodiments, the processing unit 104 includes sub-units for horizon detection 122, object detection 124, object selection 126, and pro-cessed object image generation 128 in order to process the obtained first image. These afore-mentioned sub-units will be further described in details with reference to FIGS. 2 and 4.

In some embodiments, upon the object selection sub-unit 126 determines that one or more detected objects are collision hazardous, the processing unit 104 communicates with a notifying unit 108, which in turn communicates the collision hazard information determined based on the detected one or more objects to the pilot control system 150 of the vehicle. In some embodiments, such selection unit is further enabled with machine learning capabilities such that the criteria by which collision hazardous objects are selected can be trained and refined based on data and feedback later provided or gathered by the detection and avoidance system or by other systems of the vehicle.

In some other embodiments, the processing unit 104 communicates the processed first image and the second image to an analyzing unit 106. According to various embodiments, the analyzing unit 106 employs a variety of recognition systems and tools for the purposes of classifying or identifying the detected objects. The classification or identification results produced by the analyzing unit 106, as well as the collision hazard information determined therefrom, are communicated to the notifying unit 108. In some embodiments, the classification information is fed to train the above-described selection sub-unit for making selection of collision hazardous objects by use of the UV image only. In some embodiments, such recognition or identification systems and tools are enabled with machine learning capabilities. In some embodiments, the analyzing unit 106 includes a single channel classifier 142. In some other embodiments, the analyzing unit 106 includes a multiple channel classifier 144. The single channel classifier 142 and the multiple channel classifier 144 will be further described in details with reference to FIG. 3.

Upon receiving collision hazard information from the processing unit 104 or the analyzing unit 106, the notifying unit 108 communicates the collision hazard information to the pilot control system 150. In some embodiments, the pilot control system 150 is an autopilot control system for the vehicle. Given the collision hazard information received, options of avoidance maneuvers, for example, by calculating an alternative flight path, adjusting its own velocity or altitude, etc. can be generated accordingly. In some embodiments, avoidance maneuvers are determined with consideration of the vehicle's own flight status such as the altitude and velocity data. As a result, the pilot control system 150 maneuvers the vehicle to avoid the detected collision hazard.

Figure 2:
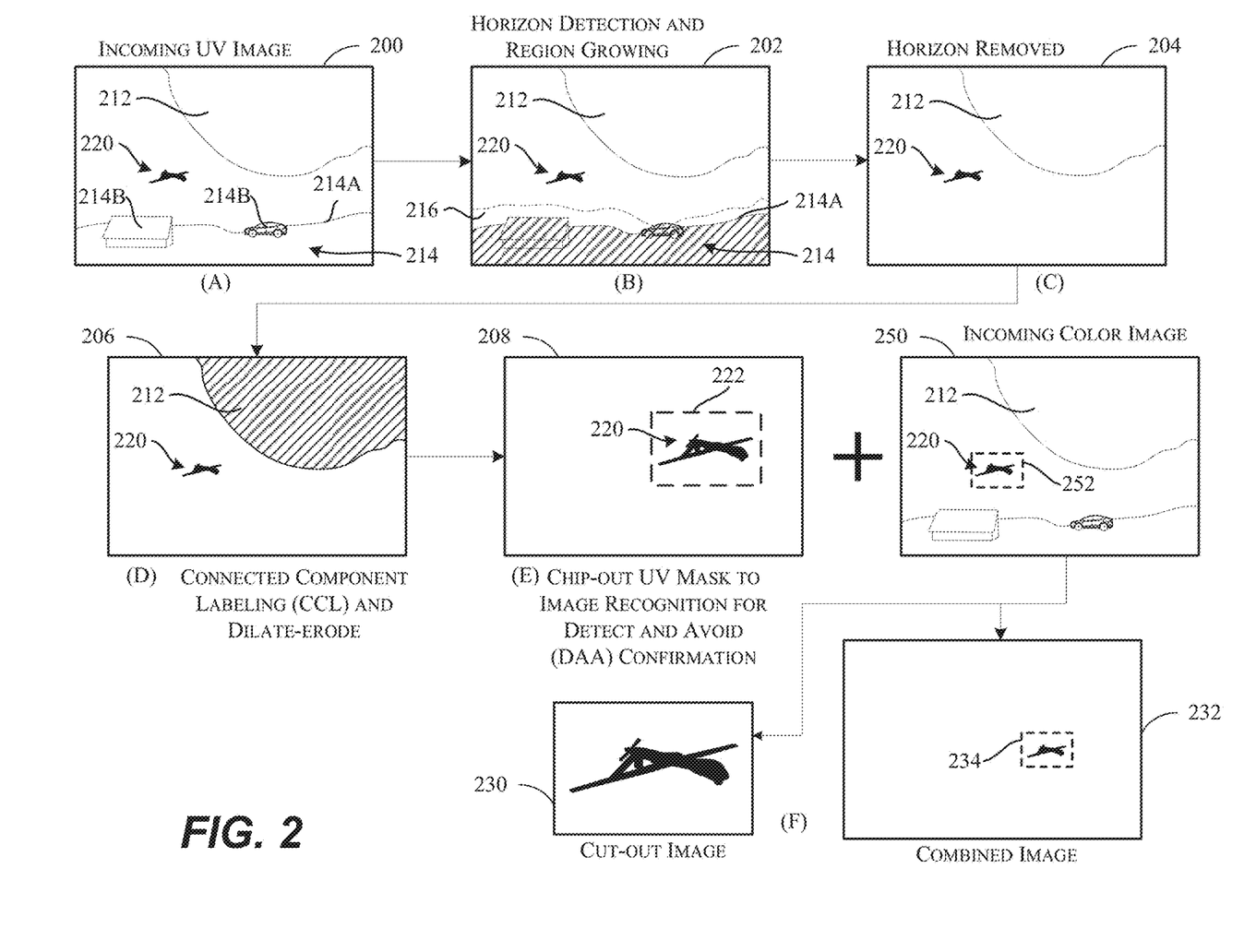
FIG. 2 illustrates a sequence of intermediate images at various stages of processing by an example detection and avoidance system, in accordance with one or more embodiments of the present disclosure.

FIG. 2 illustrates a sequence of intermediate images at various stages of processing by an example detection and avoidance system for a vehicle in accordance with one or more embodiments of the present disclosure. Starting in stage (A) in the sequence, an incoming UV image 200 captured at the first camera channel is received by a processing unit of the detection and avoidance system. The incoming UV image 200 is shown to include, in its field of view, example objects such as a cloud object 212, an airborne object 220, a horizon 214 having a horizon edge 214A as well as a number of ground objects 214B (e.g., a house and a car, etc.) connected thereto. For the purpose of simplicity in illustration, only one cloud object 212 and one airborne object 220 are depicted herein. In various embodiments, either the number of objects of one type of class or the number of object types or object classes is not limited.

At stage (B), a process of horizon detection is performed on the image 200 for the purposes of focusing on objects of interest above the horizon. First, the horizon edge or horizon line 214A is detected so as to determine the pixel regions in the image occupied by the horizon. Next, the region below the horizon edge 214A (horizon region) is filled by use of, for example, flood fill such that the entire horizon region is in uniformly dark or "ON" pixels (as indicated by the hashed region). In some embodiments, flood fill is performed, for example, from a location inside outwardly to the horizon edge 214A. In some other embodiments, flood fill is performed from the horizon edge 214A inwardly to the inside of the region. Then, the horizon region 214 is grown to add to the region one or more neighboring pixels until ground objects 214B are entirely included or sub-merged in the horizon region. As shown herein, the horizon region 214 is grown upward into the sky area to form an new edge 216 (as indicated by the dotted line), the grown edge 216 enclosing all the ground objects 214B (e.g., the house and the car, etc.) below in the horizon region 214 without any ground objects extruding upward therefrom.

In various embodiments, the horizon region growing can be performed by any region growing processes. For example, the one or more neighboring pixels to be added to the horizon region satisfy a pre-determined threshold criterion for being added thereto. As a result of the processing at stage (B), an intermediate image 202 containing the horizon region 214 modified to have the elevated new edge 216 is produced.

At stage (C), the intermediate image 202 is further processed to remove the entire horizon region 214 below the new horizon edge or horizon line 216. As a result, an intermediate image 204 only containing the airborne object 220 and the cloud object 212 is produced.

At stage (D), the intermediate image 204 is still further processed for the purposes of detecting one or more objects of interest contained therein. According to various embodiments of the present disclosure, any suitable computer vision techniques can be utilized to detect objects in the intermediate image 204. For example, in some embodiments, Connected Component Labeling (CCL) is used to identify and label objects in the image. Under CCL, neighboring pixels having density values differing by less than a predetermined threshold are considered connected and being part of the same object. Therefore, those pixels are assigned the same object label. As shown herein, both the airborne object 220 and the cloud object 212 are identified as connected components by use of CCL. In other words, post the application of CCL, both are the candidate detected objects of interest in the intermediate image 206. Again, for the purposes of simplicity, only one cloud and one airborne object are shown to be detected by the CCL technique herein. The number of the components or objects that can be detected by use of CCL is not limited. In some embodiments, the image is preprocessed before the application of CCL to prevent CCL from growing multiple objects together.

In some embodiments, further morphological operations such as dilation and/or erosion are performed for one or more objects labeled by CCL to handle or remove the noise pixels from the one or more labeled objects. In some embodiments, such handling by use of the dilation and erosion is repeated as many times as needed to remove the noise pixels. In some embodiments, the further processed one or more objects are further screened to select for candidate collision hazardous objects. In other words, objects that are not likely to be collision hazards when judged by a variety of rules or criteria are excluded from the one or more objects detected. In some embodiments, the selection criterion is the size of an object. For example, when an object (e.g., the cloud object 212) occupies an area of more than a pre-determined threshold, e.g., 30% of the intermediate image 206, such object is considered highly likely to be a cloud and not likely a mid-air collision hazard. In some embodiments, a maximum size for a potential mid-air collision hazard or object can be computed given the information of the camera resolution, the distance from the object and the velocity of the vehicle. Accordingly, objects of sizes larger than the computed size can be excluded as too large to be a hazard. In some embodiments, the selection criteria, such as the percentage threshold, are derived from empirical data. In some embodiments, the selection criteria such as the percentage threshold is determined by a machine learning system trained with feedback data.

In some embodiments, the object regions are sorted in accordance with their respective sizes. For example, a region can identified as the minimum region, while another region the maximum region identified. In some embodiments, a pre-determined minimum and/or maximum sizes of the regions can be obtained so that regions of a size smaller than the minimum size, or a size larger than the maximum size are to be considered as non-candidate objects. Again, the respective minimum and maximum sizes can be derived from empirical data, or determined by use of a machine learning system trained with feedback data.

As shown here, the cloud object 212 occupies too large an area in the intermediate image 206 and therefore is not selected as the detected collision hazardous object. On the other hand, the airborne object 220 is selected as the object detected by the detection and avoidance system. Accordingly, the cloud object 212 is removed from the objects labeled by the process of CCL. As a result of the processing of stage (D), an intermediate image 208 containing only the airborne aircraft object 220 is produced. In some embodiments, the intermediate image 208 serves as a mask or threshold image, which contains and defines only regions of ON pixels corresponding to regions of interest in the original incoming first image 200. In other words, the mask image 208 can serve as a threshold to assist a region-finding algorithm for the vision based collision detection and avoidance. As shown herein, the airborne aircraft 220 is the only object depicted in the mask image 208.

At stage (E), with reference to the incoming color image 250 captured at the second camera channel, either a color cut-out image 230 of the airborne object 220, and/or an image 232 combining the intermediate image 208 and the second image 250 is produced as the final intermediate image output at stage (F). In some embodiments, based on the mask image generated, one or more first regions are identified in the first image. As the first and second image capture substantially same views, one or more second regions in the second image corresponding to the one or more first regions are identified accordingly. As shown herein, by use of a box 222 for the aircraft object 220 in the first image, a corresponding region 252 for the same aircraft object 220 is identified in the second image 250. In some embodiments, the box 222 is utilized to chip out the box 252 so as to create the cut-out image 230. In some other embodiments, a combined image 232 is generated by merging the mask image 208 with the second image 250. As shown herein, the combined image 232 depicts only the detected object, the airborne aircraft 220, within a box 234.

Figure 3:
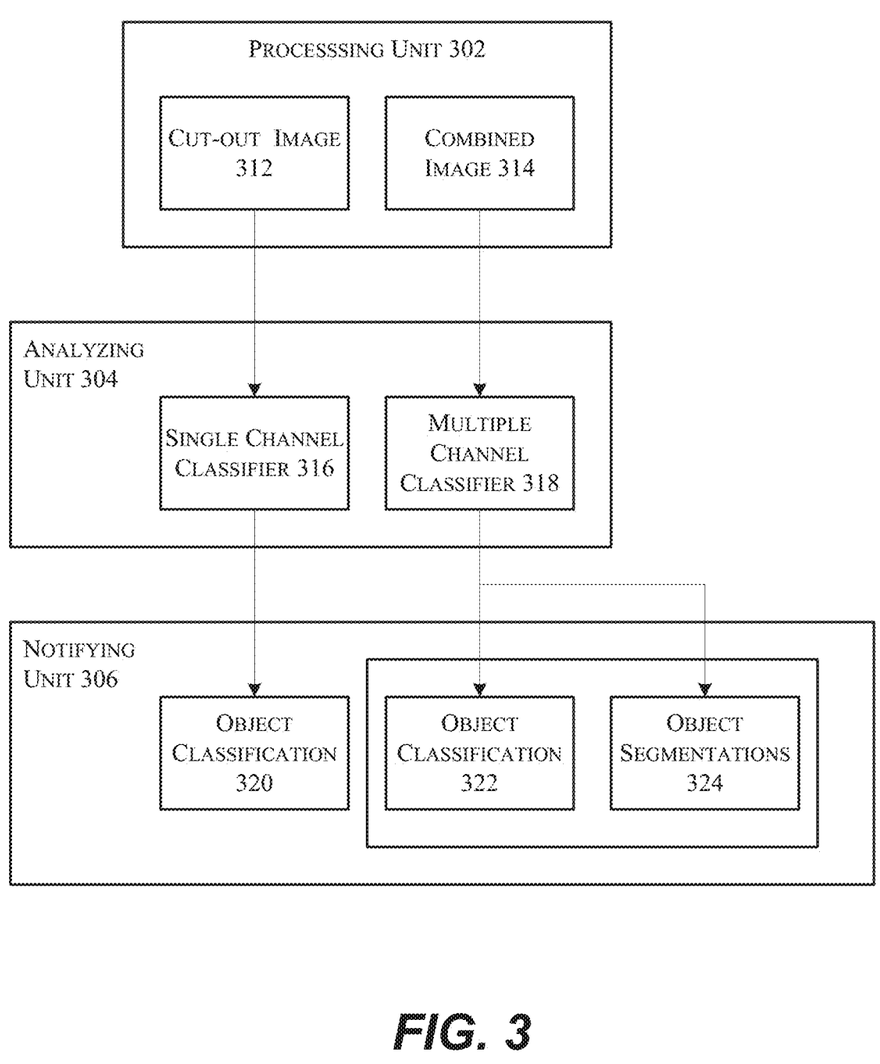
FIG. 3 illustrates a detailed schematic block diagram of an example detection and avoidance system analyzing the detected objects, in accordance with one or more embodiments of the present disclosure.

FIG. 3 illustrates a detailed schematic block diagram of an example detection and avoidance system analyzing the detected objects in accordance with one or more embodiments of the present disclosure. In some embodiments, a processing unit 302 of a detection and avoidance system (not shown) outputs a cut-out image 312 processed from the first image and the second image, as described above, to an analyzing unit 304. In some other embodiments, the processing unit 302 outputs a combined image 314 processed from the first image and the second image, as described above, to the analyzing unit 304. In some embodiments, the first image is a UV image, which represents one or more objects not emitting or re-emitting radiation at the wavelength in the UV range in the field of view in dark or ON pixels.

According to various embodiments of the present disclosure, when the cut-out image 312 is communicated to the analyzing unit 304 as a result of the processing of the first and second images by the processing unit 302, a single channel classifier 316 is utilized to analyze the cut-out image 312. In various embodiments of the present disclosure, the single channel classifier 316 utilizes a machine learning system that has been trained to identify and label pixels according to corresponding categories and classes to categorize the object of the cut-out image. In some embodiments, the single channel classifier 316 includes, for example and not limited to, AlexNet, GoogLeNet, or any suitable neural networks. In some embodiments, the neural network system can be a convolutional neural network. In some embodiments, the neural network may comprise multiple computational layers.

Such neural network can be trained to categorize a variety of object classes, for example but not limited to, various types of aircrafts, birds, etc. The neural network can also produce the results of the probabilities of a pixel being of an object class. For example, the neural network may generate classification data showing that the aircraft contained in the cut-out image 312 has a probability of 0% of being of Boeing 787 Dreamliner, a probability of 5% of being a F-16 fighter jet, a probability of 95% of being a Boeing T-X trainer, and a probability of 15% of being a GA jet.

According to various embodiments of the present disclosure, when the combined image 314 from both the processed first image and the second image are communicated to the analyzing unit 304, a multiple channel classifier 318 of the analyzing unit 304 is utilized to analyze the combined image 314. In various embodiments of the present disclosure, the multiple channel classifier 318 utilizes a machine learning system that has been trained to identify and label pixels according to corresponding categories and classes to categorize the object of the combined image 314, as well as perform segmentations (e.g., a bounding box) for the objects. In some embodiments, the multiple channel classifier 318 includes, for example, but not limited to, DetectNet, FCN-8 (Berkeley), PVAnet, YOLO, DARTnet, or any suitable commercial and/or proprietary neural networks. In some embodiments, the neural network system can be a convolutional neural network. In some embodiments, the neural network may comprise multiple computational layers.

Given the result vector of the categories and their respective probabilities, the analyzing unit 304 classifies the detected aircraft object as most likely a T-X trainer and communicates the object classification 320 to the notifying unit 306. When a multiple channel classifier 318 is utilized, object segmentations 324 (the bounding box for the aircraft object 220 in the second image) are also communicated to the notifying unit 306, in addition to an object classification 322. Accordingly, the collision hazard information is determined based on the classification information or both the classification information and the segmentation information. For example, a database for the characteristic of an aircraft of a T-X trainer can consulted to determine the maximum speed it is capable of so as to calculate how long it takes the detected T-X trainer to cross path with the vehicle without avoidance maneuvers.

Figure 4A:
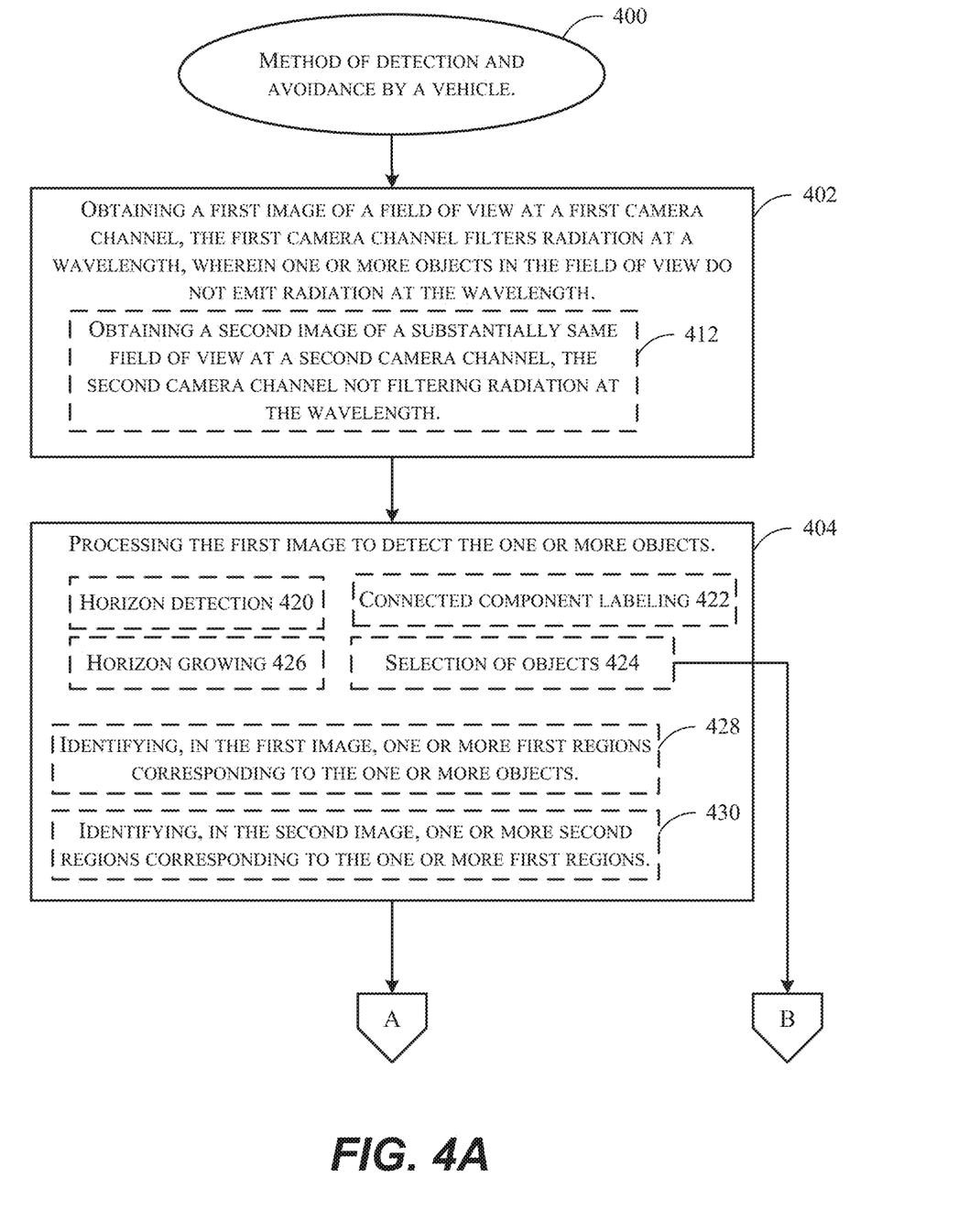
FIGS. 4A-4B illustrates a flow chart of an example method for detection and avoidance of collision hazards for a vehicle in accordance with one or more embodiments of the present disclosure. In various embodiments.
Figure 4B:
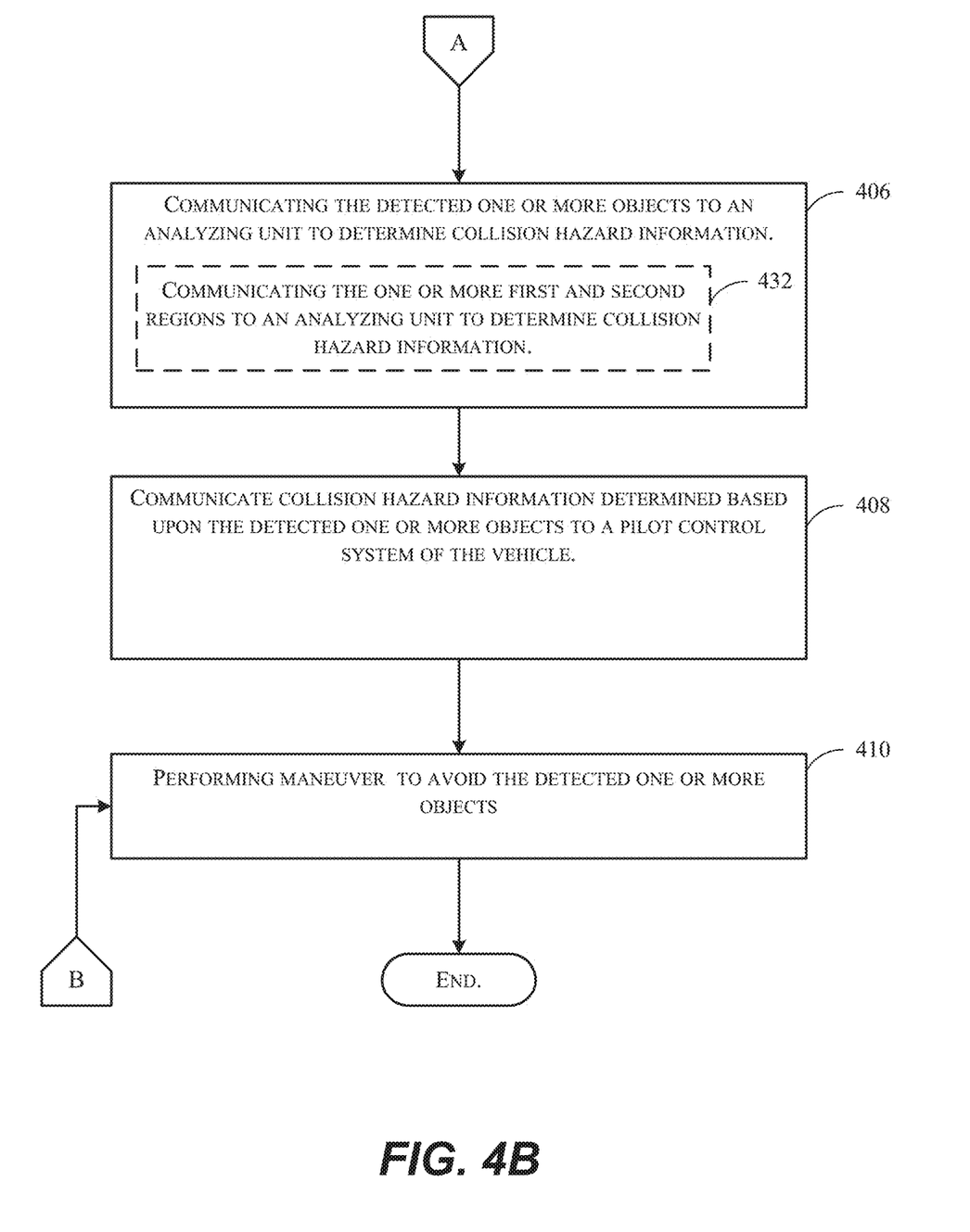

FIGS. 4A and 4B illustrate a flow chart of an example method 400 for detection and avoidance of collision hazards for a vehicle in accordance with one or more embodiments of the present disclosure. In various embodiments, method 400 operates a detection and avoidance system 100 to detect and to communicate the detected collision hazards to a pilot control system such as an autopilot control system of the vehicle such that the vehicle is maneuvered in avoidance of the communicated collision hazard.

At step 402, a first image or image frame of a field of view is obtained at a first camera channel. With the first camera channel filtering radiation at a certain wavelength, the first image renders a representation of one or more objects that do not emit or re-emit radiation at the certain wavelength in dark or ON pixels. The objects in the field of view that do emit or re-emit radiation at the wavelength, as well as the background illuminated with radiation at the wavelength, are captured as white or OFF pixels. In some embodiments, the wavelength is within the ultraviolet (UV) range. For example, objects such as, but not limited to, a cloud, an aircraft, a bird, or ground objects (e.g., houses, high-rising towers, cars etc.) and a horizon are the objects that do not emit or re-emit radiation in the UV range. On the other hand, when the sky is generally illuminated with radiation from the sun in UV range, sky areas in the field of view not obscured by objects not emitting or re-emitting radiation in the UV range are areas of radiation at the wavelength. The filtering of radiation in the UV wavelength range can be performed by any suitable technologies. In some embodiments, the first camera channel filters radiation by use of a filter having a bandpass wavelength range in the ultraviolet (UV) range.

In some embodiments, in addition to the first image, a second image or image frame is captured at a second camera channel at step 412. The second image or image frame captures a field of view that is substantially the same as the field of view at which the first camera channel captures the first image. Contrary to the first camera channel, the second camera channel does not filter the radiation at the wavelength configured for the first camera channel.

At step 404, the first image is processed to detect one or more objects. Those one or more objects may pose potential collision hazards to the vehicle. According to various embodiments of the present disclosure, the first image goes through a series of processing stages such as horizon detection 420, connected component labeling 422 to detect objects, and selection of objects 424 from the detected objects. In some embodiments, at step 420, a horizon detection is performed to detect a horizon region captured in the first image. In response to a detected horizon region, the first image is further processed to grow the horizon region in order to delete the regions together with the ground objects. In some embodiments, the horizon region is flood filled. Next, in some embodiments, at step 426, the horizon region is grown by adding neighboring pixels to include ground objects extending from an edge of the horizon region. Lastly, the grown horizon region is removed from the first image as a result of the horizon detection so that the first image is processed into a first intermediate image of the first image.

At step 422, in some embodiments, the one or more objects are detected by use of connected component labeling (CCL) to process the first intermediate image. Afterwards at step 424, in some embodiments, from the detected one or more objects, selection by a criterion is performed to exclude objects not likely collision hazards. Once the one or more objects are further selected, those one or more selected objects are considered the detected collision hazardous objects, based on which collision hazard information is determined. Accordingly, along a path to step 410, such collision hazard information determined based upon the detected one or more selected objects are communicated to a pilot control system of the vehicle such that avoidance maneuvers can be performed by the pilot control system accordingly.

In some embodiments, the selection of objects employs a machine learning system that has been trained to select object by use of UV image only. In some embodiments, the machine learning system may utilize a neural network system, which may be a convolutional neural network. In some embodiments, the neural network may comprise multiple computational layers.

At step 428, one or more first regions corresponding to the one or more objects selected at step 424 are identified in the first image. Such first region may encompass or enclose the entire object selected. For example, a first region can be a bounding box of an object such that the first region is a cut-out region or mask region of the enclosed object in the first image.

At step 430, one or more second regions corresponding to the one or more first regions are identified in the second image. As the second image represents a field of view that is substantially the same as which the first image represents, regions of pixels in the two images correspond to each other in the sense that they represent the same objects in the field of view. For example, by mapping the identified one or more first regions in the first image to the second image, the one or more second regions are identified.

At step 406, the detected one or more objects are communicated to an analyzing unit to determine collision hazard information based on the detected objects. In some embodiments, at step 432, the one or more first and second regions identified at steps 428 and 430, respectively, are communicated to an analyzing unit to determine collision hazard information. In some embodiments, the above-described cut-out images are communicated to the analyzing unit. In some other embodiments, the above-described combined images are communicated to the analyzing unit.

According to various embodiments of the present disclosure, method 400 can employ a machine learning system (e.g., the single channel classifier 316 and/or the multiple channel classifier 318) to classify the one or more objects. In some embodiments, the machine learning system classifies the type or the class of the one or more detected objects. In some embodiments, region segmentations are further produced for the one or more objects upon recognition.

At step 408, collision hazard information determined based upon the detected one or more detected objects are communicated to a pilot control system of the vehicle such that avoidance maneuvers can be performed by the pilot control system. The collision hazard information may also include characteristics of the object such as size, speed, heading, and/or other pertinent information derived from the classification information for the detected one or more objects. And at step 410, one or more avoidance maneuvers (e.g. evasive maneuvers) are performed by the pilot control system of the vehicle to avoid the detected one or more objects accordingly.

Figure 5:
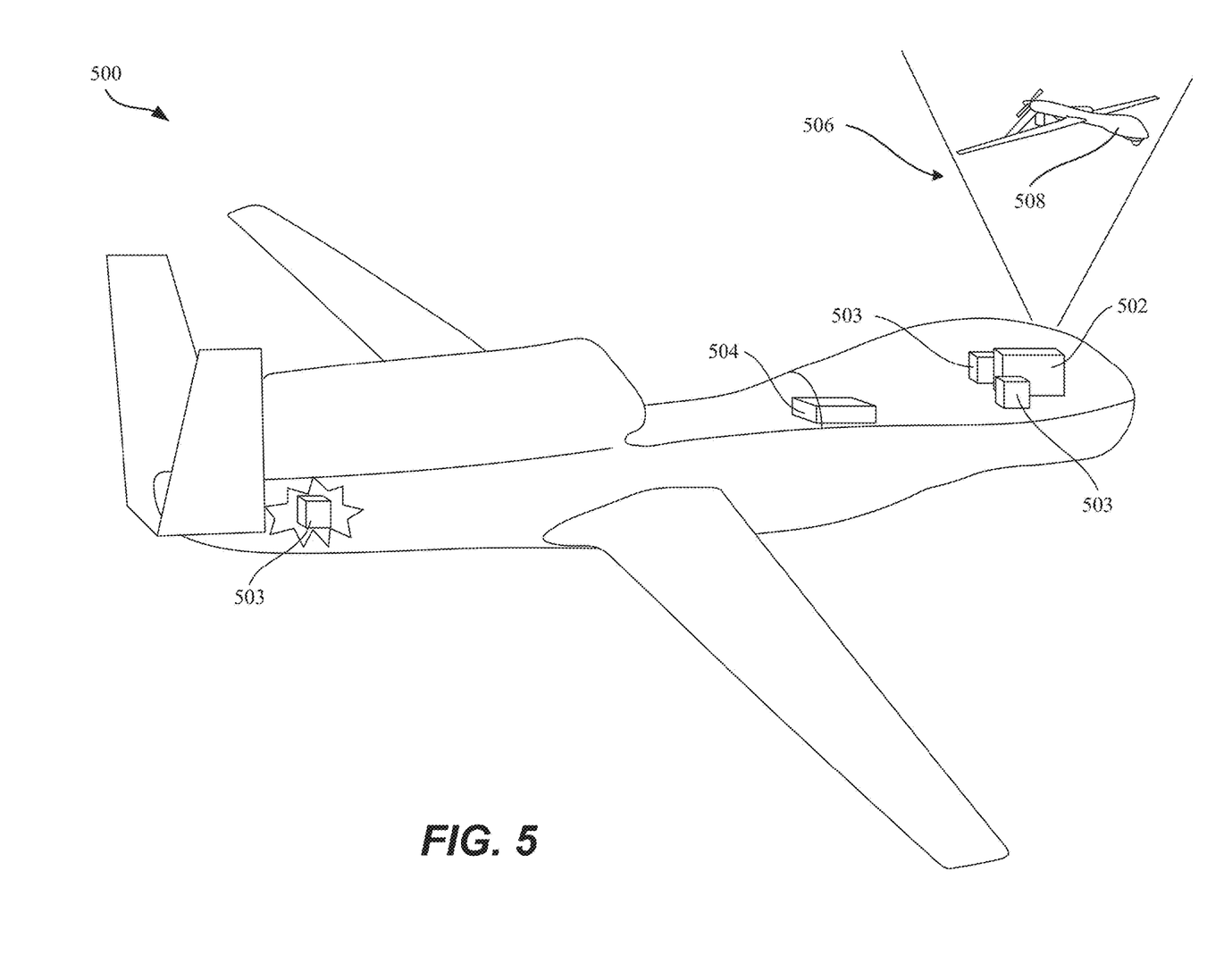
FIG. 5 illustrates a perspective view of an unmanned aerial vehicle (UAV) equipped with an example detection and avoidance system and in the vicinity of another aircraft, in accordance with one or more embodiments of the present disclosure.

FIG. 5 illustrates a perspective view of an example unmanned aerial vehicle (UAV) 500 equipped with an example detection and avoidance system and in the vicinity of another aircraft 508, in accordance with one or more embodiments of the present disclosure. The UAV 500 includes a pilot control system 504 communicatively coupled to a detection and avoidance system 502. In some embodiments, the detection and avoidance system 502 obtains image frames at the camera channels (not shown) coupled to a plurality of cameras 503 that can be positioned at various locations of the UAV 500. For example, the cameras 503 can be positioned at extremities of the UAV 500 including, for example, but not limited to, the nose and tail end (not shown). For another example, the cameras 503 can be positioned and distributed to be forward looking, side-way looking, upward looking, downward looking, or rearward looking. As shown herein, at the cameras 503, the detection and avoidance system 502 captures images of a field of view 506, in which the aircraft 508 appears to be approaching from a distance. Based on the image frames captured for the field of view 506, the detection and avoidance system 502 processes and analyzes the image frames, e.g., the first image and the second image, as above-described, to determine whether and how the aircraft 508 is a collision hazard.

Upon the determination of the collision hazard information, the detection and avoidance system 502 notifies the determined collision hazard information to the pilot control system 504 of the UAV 500 such that the UAV 500 executes a maneuver to avoid the detected aircraft 508. In some embodiments, the pilot control system is an autopilot control system. In some embodiments, the detection and avoidance system 502 determines how the aircraft 508 poses a collision hazard so that the UAV is instructed to change its velocity and/or course of flight accordingly to avoid the aircraft 508. In some embodiments, one or more maneuver options are generated based on the collision hazard information and one that addresses the hazard posed by the object being classified as multiple classes is performed to best avoid the collision.

Figure 6:
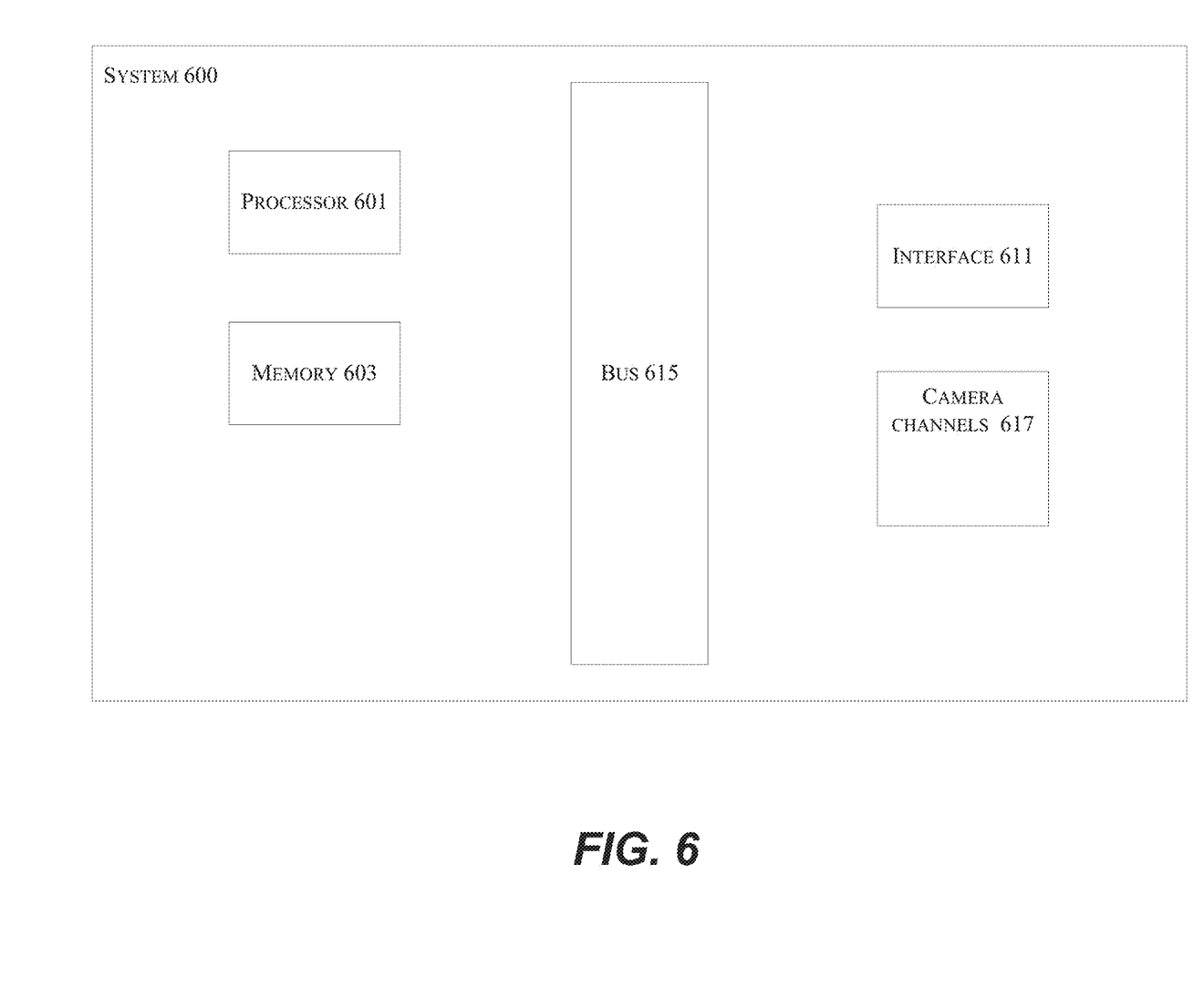
FIG. 6 illustrates a schematic block diagram of an example system capable of implementing various processes and systems in accordance with one or more embodiments of the present disclosure.

FIG. 6 is a block diagram illustrating an example system 600 capable of implementing various processes and systems described in the present disclosure. In some embodiments, system 600 may be a detection and avoidance system, and one or more embodiments may be implemented in the form of a non-transitory computer readable medium storing one or more programs to operate the detection and avoidance system. According to particular embodiments, system 600, suitable for implementing particular embodiments of the present disclosure, includes a processor 601, a memory 603, an interface 611, a bus 615 (e.g., a PCI bus or other interconnection fabric), and camera channels 617, and operates to detect and avoid collision hazards for a vehicle, such as within a detection and avoidance (DAA) system.

Operatively coupled to the processor 601, the camera channels 617 are configured so that the system 600 captures images thereat. In some embodiments, when acting under the control of appropriate software or firmware, the processor 601 is responsible for obtaining a first image of a field of view at a first camera channel (such as at step 402), processing the first image to detect the one or more objects (such as in step 404), communicating collision hazard information determined based upon the detected one or more objects to a pilot control system of the vehicle (such as in step 408), and performing maneuvers to avoid the detected one or more objects (such as at step 410). In some embodiments, the processor 601 is further responsible for obtaining a second image of a substantially same field of view at a second camera channel (such as at step 412), identifying, in the first image, one or more first regions corresponding to the one or more objects (such as at step 428), identifying, in the second image, one or more second regions corresponding to the one or more first regions (such as at step 430), and communicating, the one or more first and second regions to an analyzing unit to determine collision hazard information (such as at step 406).

In other embodiments, the processor 601 may be responsible for horizon detection (such as at step 420), and/or detecting one or more objects by use of Connected Component Labeling (CCL) (such as at step 422), and/or selecting by a criterion, from the detected one or more objects to exclude objects (such as at step 424), and/or analyzing the detected objects to classify the objects; and/or or analyzing the detected objects to classify the objects and to produce segmentations of the objects in addition. In some other embodiments, the processor 601 may be responsible for analyzing the detected objects by use of machine learning mechanism. Various specially configured devices can also be used in place of a processor 601 or in addition to processor 601.

The interface 611 may be configured to send and receive data packets or data segments, for example, over a network. Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions for obtaining a first image of a field of view at a first camera channel (such as at step 402), processing the first image to detect the one or more objects (such as in step 404), communicating collision hazard information determined based upon the detected one or more objects to a pilot control system of the vehicle (such as in step 408), and performing maneuvers to avoid the detected one or more objects (such as at step 410). In some embodiments, the processor 601 is further responsible for obtaining a second image of a substantially same field of view at a second camera channel (such as at step 412), identifying, in the first image, one or more first regions corresponding to the one or more objects (such as at step 428), identifying, in the second image, one or more second regions corresponding to the one or more first regions (such as at step 430), and communicating, the one or more first and second regions to an analyzing unit to determine collision hazard information (such as at step 406).

In some embodiments, the memory 603 may store data and program instructions for horizon detection (such as at step 420), and/or detecting one or more objects by use of Connected Component Labeling (CCL) (such as at step 422), and/or selecting by a criterion, from the detected one or more objects to exclude objects (such as at step 424), and/or analyzing the detected objects to classify the objects; and/or or analyzing the detected objects to classify the objects and to produce segmentations of the objects in addition. In some other embodiments, the stored data and program instructions are for analyzing the detected objects by use of machine learning mechanism.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A detection and avoidance system, comprising:
    a processor operable as an imaging unit and configured to obtain a first binary image of a field of view, wherein:
        one or more objects in the field of view do not emit radiation at a particular wavelength; and
        each pixel in the first binary image is labeled as "ON" or "OFF" depending on a set threshold;
        the processor is further configured to receive the first binary image from the imaging unit and detect one or more objects in the first binary image; and
    an interface operable as a notifying unit and configured to communicate collision hazard information determined based on the one or more objects detected in the first binary image.

2. The detection and avoidance system of claim 1, wherein the particular wavelength is within the ultraviolet range.

3. The detection and avoidance system of claim 1, wherein the one or more objects are detected in the first binary image using horizon detection.

4. The detection and avoidance system of claim 3, wherein the horizon detection comprises growing a horizon region by adding neighboring pixels to include ground objects extending from an edge of the horizon region.

5. The detection and avoidance system of claim 1, wherein the one or more objects are detected using of connected component labeling (CCL).

6. The detection and avoidance system of claim 1, wherein the processor is further configured to select, by a criterion, from the detected one or more objects to exclude objects not likely to be collision hazards.

7. The detection and avoidance system of claim 1, wherein the processor is further configured to determine the collision hazard information based on the detected one or more objects.

8. A method of detection and avoidance by a vehicle, the method comprising:
    obtaining a first binary image of a field of view at a processor operable as an imaging unit, wherein:
        one or more objects in the field of view do not emit radiation at a particular wavelength; and
        each pixel in the first binary image is labeled as "ON" or "OFF" depending on a set threshold;
    detecting one or more objects in the first binary image using the processor; and
    communicating, using an interface operable as a notifying unit, collision hazard information determined based on the one or more objects detected in the first binary image.

9. The method of claim 8, wherein the particular wavelength is within the ultraviolet range.

10. The method of claim 8, wherein obtaining the first binary image includes horizon detection.

11. The method of claim 10, wherein the horizon detection comprises growing a horizon region by adding neighboring pixels to include ground objects extending from an edge of the horizon region.

12. The method of claim 8, wherein the one or more objects are detected using of connected component labeling (CCL).

13. The method of claim 8, wherein obtaining the first binary image further includes selecting, by a criterion, from the detected one or more objects to exclude objects not likely to be collision hazards.

14. The method of claim 8, further comprising determining, using the processor, the collision hazard information based on the one or more objects detected in the first binary image.

15. A non-transitory computer-readable storage medium having one or more programs configured for execution by a computer, the one or more programs comprising instructions for:
- obtaining a first binary image of a field of view at a processor operable as an imaging unit, wherein:
  - one or more objects in the field of view do not emit radiation at a particular wavelength; and
  - each pixel in the first binary image is labeled as "ON" or "OFF" depending on a set threshold;
- detecting one or more objects in the first binary image using the processor; and
- communicating, using an interface operable as a notifying unit, collision hazard information determined based on the one or more objects detected in the first binary image.

16. The non-transitory computer readable medium of claim 15, wherein the particular wavelength is within the ultraviolet range.

17. The non-transitory computer readable medium of claim 15, wherein obtaining the first binary image includes horizon detection.

18. The non-transitory computer readable medium of claim 17, wherein the horizon detection comprises growing a horizon region by adding neighboring pixels to include ground objects extending from an edge of the horizon region.

19. The non--transitory computer readable medium of claim 15, wherein the one or more objects are detected using connected component labeling (CCL).

20. The non-transitory computer readable medium of claim 15, wherein obtaining the first binary image further includes selecting, by a criterion, from the detected one or more objects to exclude objects not likely to be collision hazards.

* * * * *